(No Model.)

J. J. GRAHAM.
WHEEL.

No. 591,920. Patented Oct. 19, 1897.

Witnesses.
Mark W. Dewey
Helen M. Seamans

Inventor.
Jay J. Graham
By C. H. Duell
his Attorney.

UNITED STATES PATENT OFFICE.

JAY J. GRAHAM, OF MORRISVILLE, NEW YORK.

WHEEL.

SPECIFICATION forming part of Letters Patent No. 591,920, dated October 19, 1897.

Application filed February 23, 1897. Serial No. 624,535. (No model.)

*To all whom it may concern:*

Be it known that I, JAY J. GRAHAM, of Morrisville, in the county of Madison, in the State of New York, have invented new and useful Improvements in Wheels, of which the following, taken in connection with the accompanying drawings, is a full, clear, and exact description.

My invention relates to wheels; and the object is to provide ordinary carriage-wheels with a felly that will hold the spokes, maintain the proper dish or gather, and receive a rubber or pneumatic tire.

To this end my invention consists in the combination, in a wheel, of the hub and the tenoned spokes, and a grooved mortised felly provided with lap-joints cemented together, said felly being capable of holding the wheel in a dished condition; and my invention consists in certain other combinations of parts hereinafter described, and specifically set forth in the claims.

Figure 1:
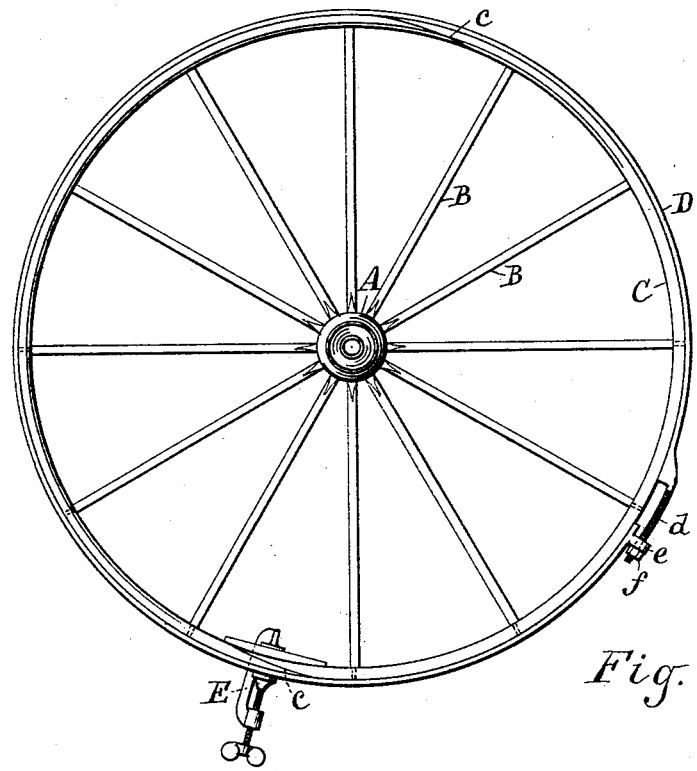
Figure 2:
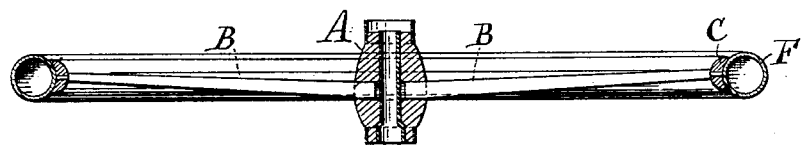
Figure 3:
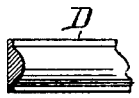

In the drawings hereto annexed and forming a part of this specification, Figure 1 is a side elevation of a wheel provided with a grooved felly and clamping devices for dishing the wheel and holding it in this position until the lap or beveled joint or joints are thoroughly united. Fig. 2 is a sectional view of the wheel with the clamping device removed and a pneumatic tire in the groove of the felly, and Fig. 3 shows a sectional view of the clamping-band.

It is well known that it is necessary to dish or gather a wooden wheel in order to gain the necessary strength and flexibility and that this is ordinarily gained and retained by means of a metal tire which is shrunk upon the wooden felly, the joints of the felly being simple butt-joints with dowels without cement.

When it is desired to provide the wooden wheel with a rubber or pneumatic tire, the felly alone must be depended upon to retain the dish in the wheel and hold itself together and upon the spokes. In order to accomplish this, the felly is provided with lap or splice joints instead of butt-joints. These joints are cemented together and while the cement is drying a clamping device is applied to the felly which compresses the joints together, forces the felly upon the ends of the spokes, and gives the proper dish to the wheel. When the joint or joints in the felly are thoroughly united by the cement or glue, the clamping device is removed and the dish is retained by the felly alone. The wheel is then ready to receive the rubber or pneumatic tire F. (Shown in Fig. 2.)

Referring specifically to the drawings, A is the hub; B B, the spokes with ordinary tenons.

C is the grooved wooden felly with mortises for the spoke-tenons and with one or more lap or splice joints $c$ $c$, which are provided with cement. Any suitable and well-known clamping means may be provided to compress the tire and hold the joints together, but I preferably employ a metal band D, coupled together at its ends by a screw $d$ on one end passing through a lug $e$ on the opposite end of the band, and a nut $f$ to adjust or shorten the band after it is applied. When the felly is grooved before it is applied to the spokes, I preferably curve the inner side of the band, as shown in Fig. 3, to fit the groove in the felly, but when the felly is grooved after the joints are united, the band is made flat. Auxiliary clamps, as E, may also be used and applied to the joints in the felly, as shown in Fig. 1.

I do not desire to be limited to the precise form of lap-joint shown in the felly nor to the clamping means for compressing the felly, as it is obvious that these may be changed without departing from my invention.

Having described my invention, what I claim as new, and desire to secure by Letters Patent, is—

1. In a wheel, the combination of the hub and the tenoned wooden spokes, and a grooved mortised felly provided with lap-joints cemented together, said felly being capable of holding the wheel in a dished condition, as set forth.

2. In a wheel, the combination with the hub and the tenoned wooden spokes, of a grooved mortised felly provided with lap-joints cemented together, said felly being capable of holding the wheel in a dished condition, and a pneumatic tire in the groove of said felly, substantially as described and shown.

In testimony whereof I have hereunto signed my name.

JAY J. GRAHAM. [L. S.]

Witnesses:
MARK W. DEWEY,
H. M. SEAMANS.